United States Patent [19]

Gardels

[11] 4,013,313
[45] Mar. 22, 1977

[54] PIPE TURNING TOOL

[76] Inventor: John H. Gardels, P.O. Box 128, Wilcox, Nebr. 68982

[22] Filed: Apr. 12, 1976

[21] Appl. No.: 676,228

[52] U.S. Cl. .................................. 294/17; 81/90 C
[51] Int. Cl.² ..................... B25B 13/50; B65G 7/00
[58] Field of Search ............... 294/4, 15, 17, 19 R; 81/3 R, 90 R, 90 B, 90 C, 119, 120; 254/44, 120, 121, 131

[56] References Cited

UNITED STATES PATENTS

| 392,752 | 11/1888 | Rankins | 294/17 |
| 720,567 | 2/1903 | Counts | 294/17 |
| 738,015 | 9/1903 | Dufresne | 81/90 B |
| 1,006,348 | 10/1911 | Beran | 294/17 UX |
| 1,527,772 | 2/1925 | Baird | 81/90 B |
| 1,936,359 | 11/1933 | Huthsing et al. | 81/90 B X |
| 1,945,406 | 1/1934 | Adams | 81/90 B |

*Primary Examiner*—Johnny D. Cherry
*Attorney, Agent, or Firm*—George R. Nimmer

[57] ABSTRACT

Disclosed are turning tools for elongated agricultural irrigation pipes which lie along the earth's surface and which include longitudinally aligned gated ports along each pipe segment for radial water emergence therefrom. The pipe turning tool, which ensures that the gated watering ports can be positioned the appropriate distance above the ground, generally comprises: an arcuate shoulder for abutment against the pipe outer side, an elongate handle rigidly attached to the shoulder and extending rearwardly therefrom and away from the pipe, and a fixed positioned stationary detent extending downwardly from a rigidly secured header and which detent is engageable with a radial discontinuity on the pipe thereby effecting turning about the pipe central-axis. Alternate tool embodiments are disclosed appropriate for use with latch-recess type radial pipe protuberances and depending upon the latch-recess spatial relationship to the aligned gated ports.

5 Claims, 8 Drawing Figures

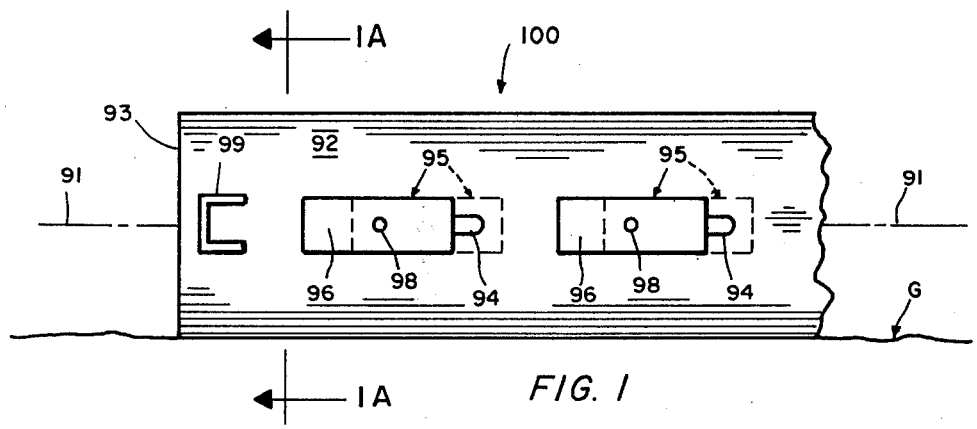
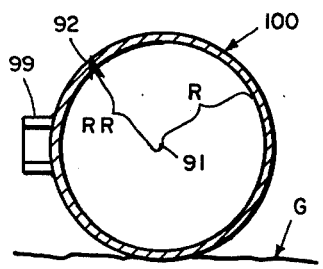
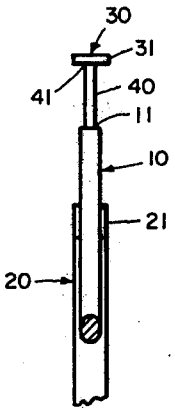
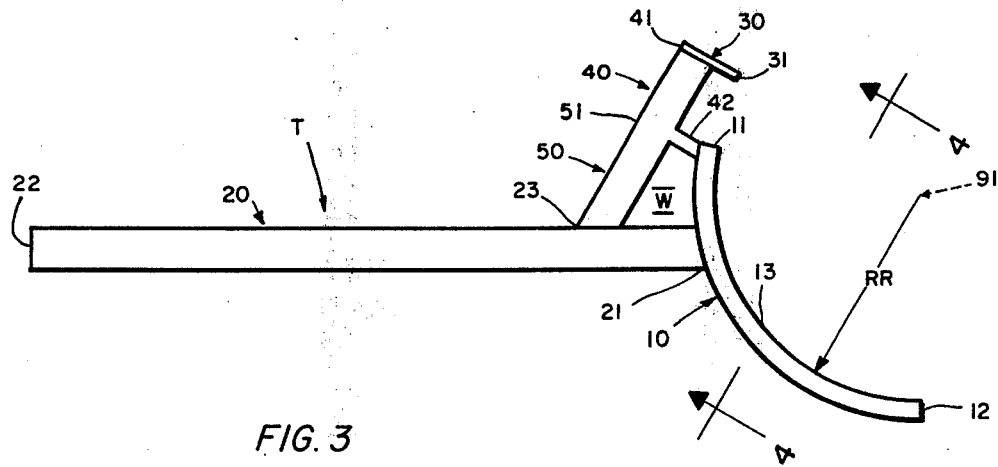

PIPE TURNING TOOL

For ditch type irrigation, a longitudinally extending string of pipe segments are laid by a ditch along the agricultural field to be irrigated. Each pipe segment is typically of circular cross-sectional shape and surrounding a longitudinally extending central-axis. Respective pipe segments usually include a plurality of longitudinally aligned sideward ports which are openable with gates so that water may spew radially therefrom onto the agricultural field. For proper agricultural irrigation, the pipe sideward ports should be spaced a judicious distance above ground level, which distance can be controlled by turnably adjusting the respective elongate pipe segments about its central-axis. In the prior art, the predominate method of adjustably turning the respective pipe segments utilizes a clamping tongs apparatus. However, such movable jaws clamping tongs apparatus tends to be structurally complicated, heavy, cumbersome to operate, and offering the potential danger of pinching the operator's fingers.

It is accordingly the general objective of the present invention to provide an improved tool for effecting adjustable turning of the respective pipe segments about its central-axis and which tool overcomes many of the disadvantages and deficiencies associated with prior art apparatus intended for similar purpose.

With said general objective in view, and other and further objects which will become more apparent as this description proceeds, the improved pipe turning tool of the present invention generally comprises: an arcuate shoulder for abutment against the irrigation pipe segment outer side, a fixed position detent extending downwardly from a header rigidly attached to the shoulder and offset from the shoulder upper-end whereby the detent can engage a radial discontinuity on the pipe, an elongate handle rigidly associated with the shoulder and extending rearwardly therefrom and away from the pipe whereby upon manipulation of the handle rear-end pipe turning about its central-axis is effected, and preferably the handle fore-end is attached to the shoulder away from the shoulder mid-point and appropriate to the style of irrigation pipe with which the tool is to be employed.

In the drawing, wherein like characters refer to like parts in the several views, and in which:

FIG. 1 is a longitudinally extending elevational view of one style of agricultural irrigation pipe with which the pipe turning tool embodiment of FIGS. 3 and 4 is particularly well adapted;

FIG. 1A is a sectional elevational view taken along line 1A—1A of FIG. 1;

FIG. 3 is a right side elevational view of one embodiment of the pipe turning tool concept of the present invention, the left side elevational view (not shown) being a substantial mirror image;

FIG. 4 is a sectional view taken along line 4—4 of FIG. 3;

Figure 2:
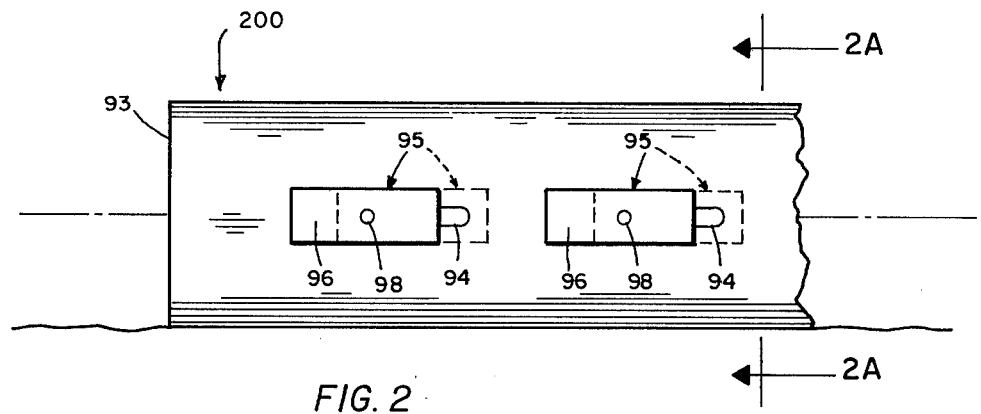
FIG. 2 is a longitudinally extending elevational view of another style of irrigation pipe with which the pipe turning tool embodiment of FIGS. 5 and 6 is particularly well adapted.

The irrigation pipe style depicted in FIGS. 1 and 1A comprises an annular sidewall 92 surrounding a longitudinally extending central-axis 91, the sidewall 92 usually being of circular cross-sectional shape including inside-radius "R" and outside-radius "RR". Each pipe segment 100 at its two ends 93 customarily includes a radially protruding latch-recess 99, by which neighboring pipe segments might be removably latched together end-to-end in conventional fashion. Each pipe segment also customarily includes a plurality of longitudinally aligned radially-extending sideward ports 94 for spewing water onto the ground G. Movable gates 95 are usually provided for controlling the water delivery rate of each port, herein ports 94 being of elongated shape and controllably covered by the longitudinally slidably movable gates 95, as indicated in phantom line in FIGS. 1 and 2. Each of the typical sliding gates 95 comprises an inward gasket 97 along the pipe inner side and an outward "boot" 96 along the pipe outer side, members 96 and 97 being held together by a connector 98 passing through and movable along elongated port 94. For pipe style 100, the gated ports 94—95 and also the latch-recesses 99 are longitudinally aligned.

Pipe style 200 herein depicted differs from style 100 only in that the latch-recesses 99 are spaced 180° from the longitudinally aligned gated ports 94—95.

Over extended periods of agricultural field irrigation, one can observe that respective pipe segments (e.g. 100, 200, etc.) have become turned to some angular extent about central-axis 91 with the result that the gated ports 94—95 have become inappropriately spaced from ground level G. However, the pipe turning tool concept of the present invention is utilized to ensure that the gated ports 94—95 can be readily adjusted to the appropriate height above ground level G, which height is most generally chosen to be substantially RR.

Figure 2A:
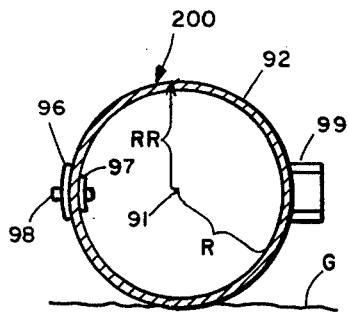
FIG. 2A is a sectional elevational view taken along line 2A—2A of FIG. 2.
Figure 6:
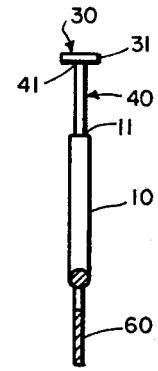
FIG. 6 is a sectional view taken along line 6—6 of FIG. 5.
Figure 5:
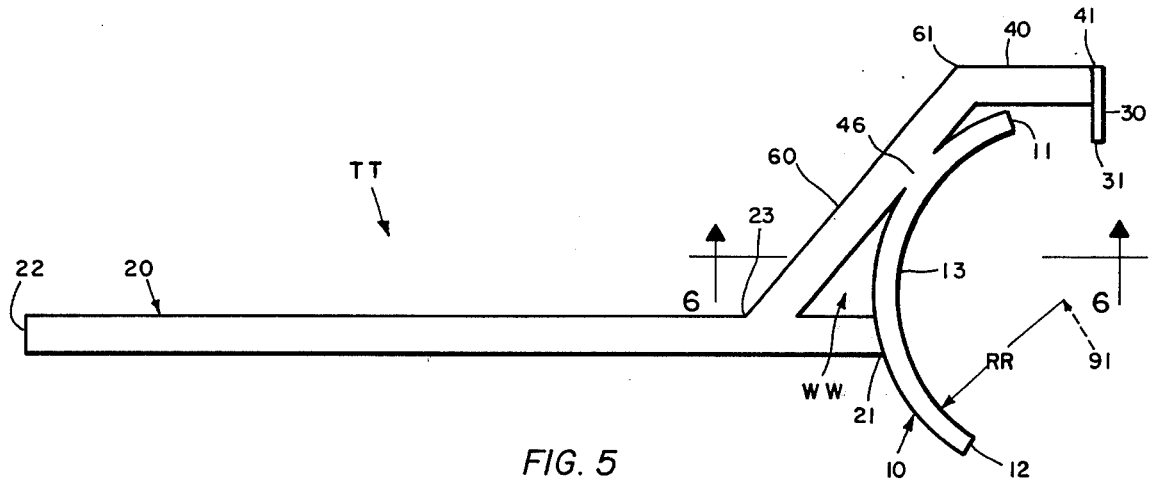
FIG. 5 is a right side elevational view of another embodiment of the pipe turning tool concept, the left side elevational view (not shown) being a substantial mirror image thereof.

The pipe turning tool embodiment T of FIGS. 3 and 4 is especially appropriate for use with irrigation pipe embodiment 100 of FIGS. 1 and 1A, while tool embodiment TT of FIGS. 5 and 6 is especially appropriate for use with the irrigation pipe embodiment 200 of FIGS. 2 and 2A. Tool embodiments T and TT comprise an arcuate shoulder 10, which is preferably spaced a substantially constant distance RR from a focal-point (i.e., pipe central-axis 91) and which is preferably formed of a single length of permanently bent metallic rod stock having a circular cross-sectional shape. Arcuate shoulder 10 has two endward terminii including an upper-end 11 and a lower-end 12 and also a geometric mid-point 13 halfway between said terminii 11 and 12. The shoulder's two endward terminii 11 and 12 with respect to focal-point 91 define an angle within the range of 60° to 135° (and preferably 75° to 120°) for appropriate secure abutment against the pipe 100, 200, etc outer side RR away from the pipe radial discontinuity (e.g. 99), but along a plane perpendicularly intersecting both said discontinuity and the central-axis 91.

Each of the tool embodiments T and TT includes an elongate lineal handle 20 which is rigidly secured with the arcuate shoulder 10 and including a rear-end 22 which is rearwardly remote from shoulder 10 and focal-point 91 and manually wieldable thereat by the operator for radial movement about pipe central-axis 91. In this vein, the handle fore-end 21 is rigidly attached, as by welding, to the shoulder 10 and desirably located away from the shoulder mid-point 13. Preferably, the handle fore-end is located sufficiently away from the shoulder mid-point 13 whereby the shoulder arcuate length from one terminus to the handle fore-end 21 bears a ratio of at least two compared to the remaining shoulder length. In the FIGS. 3 and 4 embodiment T, the dimensional ratio along shoulder 10 from lower-end 12 to the handle fore-end 21 bears a ratio exceeding two compared to the distance of handle fore-end 21 to the shoulder upper-end 11. In the FIGS. 5 and 6 embodiment TT, for pipe style 200, the dimensional ratio along shoulder 10 from upper-end 11 to the handle free-end 21 bears a ratio of at least two compared to the shoulder length from handle fore-end 21 to shoulder lower-end 12. Handles 20 are substantially co-planar with the uniplanar shoulders 10.

For each of the tool embodiments T and TT, there is a header 40 rigidly associated with the shoulder and offset rearwardly and upwardly of the shoulder upper-end 11. At the upper-forward extremity of each header 40 is a top-end 41 from which rigidly depends a downwardly extending detent 30 having a lower free-end 31 which lies a fixed-distance spatial gap from the shoulder upper-end 11. Thus, the detent lower free-end 31 is adapted to abuttably engage with the pipe radial discontinuity (e.g. latch-recess 99) while the shoulder 10 abuttably engages with the pipe wall 92 along a plane perpendicularly intersecting central-axis 91. Accordingly, manually initiated movement of the handle rear-end 22 by the tool operator furnishes controlled turning of the irrigation pipe (100, 200, etc) about its central-axis 91 to appropriately space watering ports 94 above the ground G.

The necessary rigid association of the offset header 40 and its depending detent 30 with respect to shoulder 10 is preferably afforded by a bracing member e.g. 50, 60. The bracing member extends rigidly upwardly and forwardly of the handle 20 commencing at a bracing-station 23 located nearer to the handle fore-end 21 than to its rear-end 22. Also, the brace member is rigidly attached to the header 40 and secured to the shoulder 10 at a buttress-locale (e.g. 42, 46) whereby the bracing-station 23, the buttress-locale, and the handle fore-end 21 together define a substantially triangular rigid structure (e.g. surrounding openings W, WW).

In the tool embodiment T of FIGS. 3 and 4, the header 40 and the brace member 50 consist of a single lineal length of metallic bar stock, a stud 42 connecting the brace 50 at 51 to the shoulder 10 at 11 to define closed structure W. Elements 10, 20, 30, 40, 42, and 50 are all substantially co-planar so as to lie substantially perpendicular to central-axis 91 when utilized for turning the pipe.

For the tool embodiment TT of FIGS. 5 and 6, the header 40 intersects brace 60 at 61 at a definite angle, header 40 being substantially parallel to handle 20, brace 60 being directly attached (as by welding) to shoulder 10 to define closed structure WW. Elements 10, 20, 30, 40, and 60 are all substantially co-planar so as to lie substantially perpendicular to central-axis 91 when tool TT is utilized for turning the pipe.

Thus, it can be seen that a tool operator, manually wielding the handle 20 nearer to rear-end 22 can controllably turn the irrigation pipe about its central-axis 91 to control the distance of the watering ports 94 above the ground G. From the foregoing, the construction and operation of the pipe turning tool will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. Turning tool for irrigation pipe lying upon the earth's surface and the pipe having a circular cross-sectional shape including openable gates along the pipe longitudinal length and at least one longitudinally extending radial discontinuity at the pipe outer side such as a latch-recess, said pipe turning tool comprising:

A. An arcuate shoulder for abutment against the pipe outer side remote of the pipe radial discontinuity, said shoulder being spaced a substantially constant distance from a focal-point, said shoulder having two endward terminii including an upper-end and a lower-end and also a geometric mid-point between said terminii, the two end-ward terminii and the focal-point defining an angle within the range of 60° to 135°;

B. An elongate handle having a fore-end and a rear-end for manual control by the operator, the handle and the shoulder being substantially co-planar with the handle fore-end being rigidly attached to the shoulder whereby the handle rear-end is rearwardly remote from the shoulder, the handle fore-end being located remote from the shoulder mid-point whereby the shoulder arcuate length from one terminus to the handle fore-end bears a ratio of substantially two as compared to the remaining shoulder length;

C. A header rigidly attached to the shoulder and upwardly offset of the shoulder upper-end;

D. A detent extending rigidly downwardly from the header and having a lower free-end located a fixed-distance across a spatial gap from the shoulder upper-end, said detent lower free-end being adapted to engage with the pipe radial discontinuity whereby operator initiated movement of the handle rear-end causes controlled turning of the irrigation pipe about its central-axis; and E. A brace member extending rigidly upwardly and forwardly of the handle from a bracing-station located nearer to the handle fore-end than to the rear-end, said brace member being rigidly attached to the header and also to the shoulder at a buttress-locale whereby the bracing-station, the buttress-locale, and the handle fore-end collectively define the three points of a structurally rigid triangle.

2. The pipe turning tool of claim 1 wherein the shoulder arcuate length from its lower-end to the handle fore-end bears a ratio of at least two compared to the remaining shoulder length from its upper-end to the handle fore-end; and wherein the brace member and the header comprise a single lineal length of metal structural material extending rigidly upwardly and forwardly of the handle bracing-station.

3. The pipe turning tool of claim 2 wherein the shoulder arcuate extent is within the range of 75° to 120°; and wherein the handle, the shoulder, the brace, and the header are together substantially co-planar.

4. The pipe turning tool of claim 1 wherein the shoulder arcuate length from its upper-end to the handle fore-end bears a ratio of at least two compared to the remaining shoulder length from its lower-end to the handle fore-end; and wherein the header is substantially parallel to the elongate lineal handle member.

5. The pipe turning tool of claim 4 wherein the shoulder arcuate angular extent is within the range of 75° to 120°; and wherein the handle, the shoulder, the brace, and the header are together substantially co-planar.

* * * * *